DOCUMENT STORAGE AND RETRIEVAL APPARATUS

Filed Oct. 21, 1965 4 Sheets-Sheet 1

INVENTORS
MORTON A. WEISS
BERNARD S. SPECKHART
BY Richards and Cifelli,
ATTORNEYS INVENTORS
MORTON A. WEISS
BERNARD S. SPECKHART
BY Richards & Cifelli
ATTORNEYS INVENTORS
MORTON A. WEISS
BERNARD S. SPECKHART
BY Richards & Cifelli
ATTORNEYS

DOCUMENT STORAGE AND RETRIEVAL APPARATUS

INVENTORS
MORTON A. WEISS
BERNARD S. SPECKHART
BY Richards & Geier
ATTORNEYS

United States Patent Office 3,368,688
Patented Feb. 13, 1968

3,368,688
DOCUMENT STORAGE AND RETRIEVAL APPARATUS

Morton A. Weiss, Springfield, and Bernard S. Speckhart, Union, N.J., assignors to White Machine Co., Kenilworth, N.J., a corporation of New Jersey Filed Oct. 21, 1965, Ser. No. 499,826
6 Claims. (Cl. 211—1.5)

ABSTRACT OF THE DISCLOSURE

Apparatus is described for the storage and retrieval of documents which consists of an endless oval-path conveyor supported above the floor on which a number of racks are suspended which in turn hold a plurality of suspended filing folders. To store or retrieve documents in the filing folders, a motorized drive mechanism is provided which causes the suspended files to move around the oval track until they reach a location where it is convenient to stop the conveyor and either inert documents or remove them from the filing folders as desired.

This invention relates to improved apparatus for the storage and retrieval of documents or other articles in sheet form and, more particularly, to a conveyor rack for filing folders.

As businesses, government offices, research organizations, libraries, educational institutions and similar enterprises have grown in size and complexity, the problem of storing and retrieving documents essential to the operation of these enterprises has become increasingly difficult of solution to the point where it has now assumed major importance. As is well known it is customary to store documents in filing cabinets comprising a stack of pull-out drawers. Inasmuch as storage space for filing cabinets normally does not produce income, its cost is generally regarded as a necessary expense of operation which must be kept to a minimum. Therefore, filing cabinets are normally crowded into a file room or space as closely as possible; leaving only the minimum distance between adjacent rows of cabinets required to permit full opening of a file drawer. This being the case, an open file drawer not only blocks the passageway for use by file clerks enroute to other files, but actually prevents opening of the corresponding drawer of the opposite filing cabinet in the adjacent row of cabinets. Moreover, as the required number of filing cabinets increases, the distances which must be traveled to obtain a desired document become significant, with the result that in a large organization efficiency is greatly reduced by the sheer bulk of the documents and filing cabinets, which occupy so much space that a considerable portion of a filing clerk's time is wasted in travel between filing cabinets. It is apparent, therefore, that a pressing need exists for a more efficient means for the storage and retrieval of documents.

It is an object of the present invention, therefore, to provide means for the storage and retrieval of documents which eliminates the need for traveling between widely spaced filing cabinets.

It is another object of the invention to provide means for the storage and retrieval of documents which permits filing or removal of documents without interference with adjacent storage means or passing personnel.

It is still another object of the invention to provide a document storage and retrieval means which provides access at a predetermined point to a number of stored documents equivalent to the contents of substantial number of filing cabinets, without moving from said predetermined point.

The above and other objects are achieved by the apparatus of the present invention which comprises a self-supporting continuous conveyor provided with a plurality of file folder holders supporting file folders containing documents; the conveyor being provided with means to move the stored documents along a predetermined path and to stop at a convenient location for filing or removing documents.

These and other objects of the invention which will be apparent from the detailed description below, are achieved by providing a novel combination conveyor and document storage means, an illustrative embodiment of which is shown in the accompanying drawings wherein.

Figure 1:
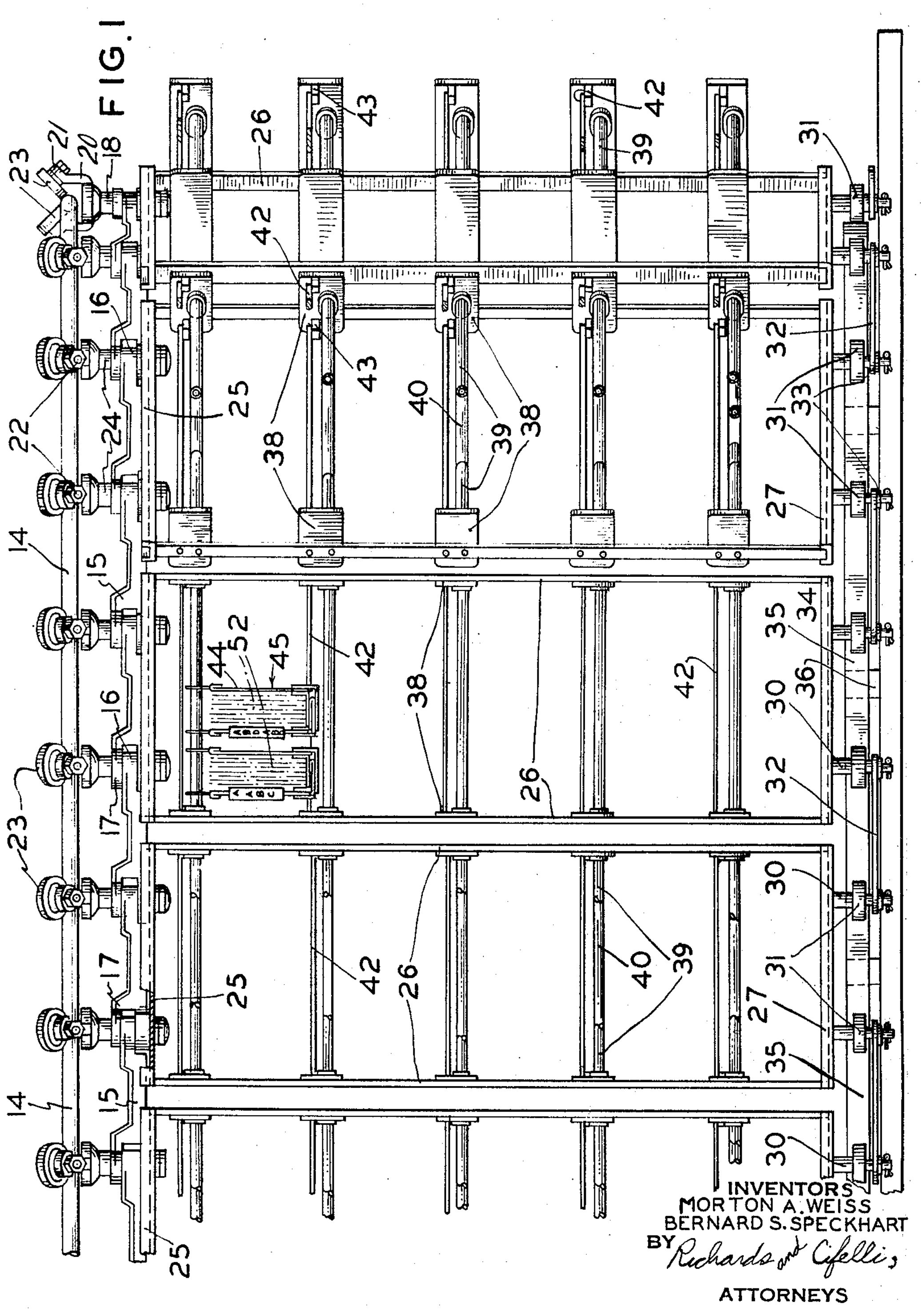
FIG. 1 is a fragmentary side elevational view of a file storage conveyor rack embodying the principles of the invention.

Referring to the drawings, in which like characters of reference indicate corresponding parts, the reference numeral 10 indicates the upper longitudinal carrier plate or beam of the conveyor rack, the same being supported by upstanding, floor footed, standards or columns 11. Suitably affixed to the upper beam 10, as by welded connection therewith, are a plurality of longitudinally spaced cross bars 12. Affixed to the opposite ends of these cross bars 12, as by welded connection therewith, and so as to depend therefrom, are hanger plates 13. Suspended by these hanger plates 13, for disposition in a horizontal plane, is an elongated endless track or rail member 14, which surrounds the upper beam 10 of the conveyor rack in outwardly offset relation thereto.

Suspended from the track member 14, for circulatory travel around the same, is a continuous carrier or drive chain. This carrier or drive chain structure comprises a series of frame members or links 15, which are pivotally connected together in end to end relation to provide an endless or continuous interlinked assembly thereof. To so pivotally interconnect the frame members 15, adjoining ends thereof are respectively provided with a male hinging knuckle 16 and a bifurcate female hinging knuckle 17. Extending upwardly through the adjoined male and female hinging knuckles 16 and 17 are pivot or hinge pins 18. To the upper end of each pivot or hinge pin 18 is affixed a trolley yoke 19, having upstanding laterally spaced apart arms 20 adapted to straddle the track member 14. Said yoke arms 20 terminate in angular bearing portions 21 which carry axle pins 22 upon which are rotatably mounted traction rollers 23. Opposite traction rollers 23 are respectively disposed in radially angular relation to the track member 14, so as to bear against and ride upon opposite sides of the top surface of the latter, thus suspending the interlinked assembly frame members or links 15 subject to circulatory travel around the track member 14.

Figure 2:
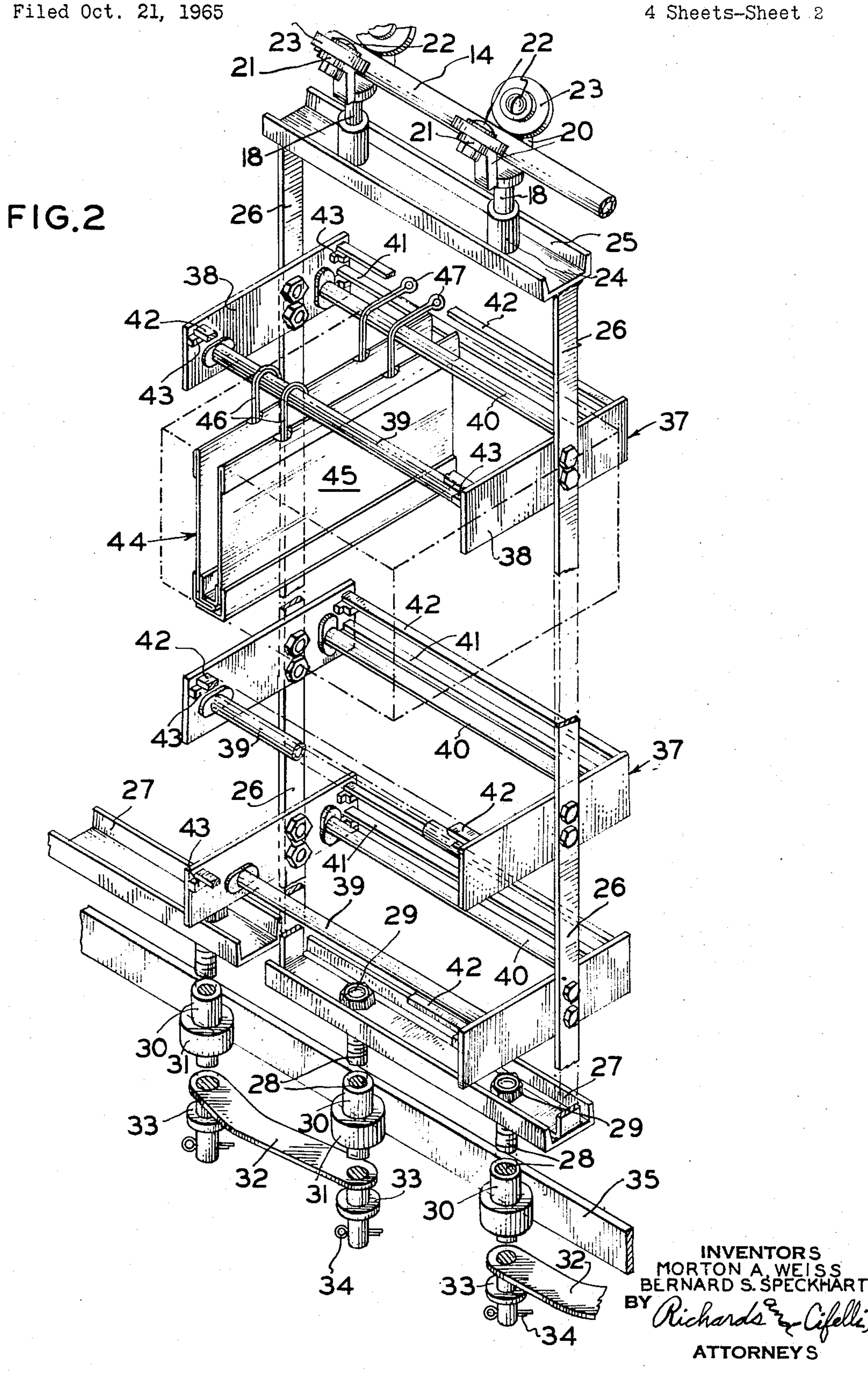
FIG. 2 is a perspective view, drawn on an enlarged scale, of one section of the file storage conveyor rack of FIG. 1, showing details of the structure thereof.

Mounted on each pivot or hinge pin 18, between the pivotally connected ends of adjoined frame members or links 15 and the trolley yokes 19, are rotatable bushings or sleeves 24 which serve to space the links 15 from the arms 20 of the yokes 19 as seen in FIG. 1. The bushings 24 as shown in FIG. 2, have dropped downward on the hinge pin 18, since the links 15 are not shown in this view in order to reveal other structure.

Carried by each successive pair of hinge pins 18 is an upper rack member 25, which may suitably take the form of a length of channel iron. The upper rack members 25 are suitably affixed to said hinge pins as by passing the lower ends of the pins through bore holes in the members 25 and threading nuts thereon. Straps 26 are suitably affixed to opposite ends of each of the upper rack members 25 by welding; or by means of the hinge pins 18 with nuts threaded onto the ends thereof, or by other suitable means. The straps 26 depending from the opposite ends of each member 25 extend downwardly toward the base of the conveyor where they are connected to the opposite ends of a lower rack member 27, which may suitably consist of a channel bar similar to member 25. The straps 26 may be affixed to the lower rack member 27 in any suitable manner, as by welding, or as shown in FIG. 2 by the use of roller shafts 28 extending through the members 26 and 27, and secured thereto by nuts 29.

The portion of each roller shaft 28 extending below the lower rack member 27 passes through a rotatable bushing or sleeve 30, a roller 31, one end of a tie bar 32 and a washer or retaining ring 33. The bushings 30, rollers 31, tie bar 32 and washers or retaining rings 33 are shown in an exploded view in FIG. 2 to better illustrate the structure of these parts. In operation, the parts are consolidated in closely adjacent position and retained by cotter pins 34 or other suitable means as shown in FIG. 1. The rollers 31 are preferably, but not necessarily fixedly mounted on the rotatably mounted bushings 30, whereby the roller shafts 18 may remain stationary with respect to the rotatable bushings 30 and rollers 31. The tie bars 32 thus serve to connect successive lower rack members 27 through the roller shafts 28 to form an endless lower roller assembly.

The lower roller assembly serves to guide the lower portion of the conveyor rack by movement along the lower track member 35. The track member 35, which may take the form of a metal strap, angle iron or other suitable structure, is suitably fastened as by welding to the opposite ends of a plurality of longitudinally spaced transverse cross bars 36, corresponding to cross bars 12 at the top of the conveyor. The cross bars 36 are affixed to the standards 11 and, if desired, may be further reinforced by the use of a longitudinal beam similar to beam 10 at the top of the conveyor.

Mounted in vertically spaced relation in the framework made up of upper and lower rack members 25 and 27 and intermediate straps 26, are a plurality of file folder carrying racks 37. These racks are made up of a pair of end plates 38 suitably affixed to the straps 26, as by bolts, for example. A front suspension bar 39 and a rear suspension bar 40 are mounted between the end plates 38 of each rack 37 with the ends of said bars anchored to said end plates by suitable means. Spaced to the rear and below the rear suspension bar 40 is a rear guard bar 41, the opposite ends of which are suitably affixed to the end plates 38, as by brazing to lugs mounted on the end plates. Each rack 37 also includes a pair of additional cross bars 42, mounted between the end plates 38 on lugs 43 near the top thereof, one bar 42 at the front and one at the rear of the rack 37. The front cross bars 42 are shown broken away in FIG. 2 so as not to hide other structure.

Hanging file folders 44 are hung from the suspension bars 39 and 40 of the rack 37. The file folders 44 consist of a U-shaped body 45 which is suitably composed of a stiff but flexible material. The lower portion of the body 45 may be suitably reinforced for extra durability and may be provided with means for lateral expansion, if desired. The upper edges of the file folders 44 may also be reinforced, as by folding the edges over as shown in FIG. 2, or by other suitable means. The file folders 44 are provided with forward hook members 46 and rear hook members 47. The radius of curvature of the hook portion of members 46 approximates that of the front suspension bar 39, thus adapting the hooks 46 to slide on the bar 39 with minimal play. The rear hooks 47, are bent at a 90° angle; the radius of curvature of the bend also approximating that of the suspension bar 40. When suspended from the suspension bars 39 and 44 said file folders 44 are stabilized by contact with the rear guard bar 41. The cross bars 42 of the rack 37 below the file folders 44 in the rack above, serve to support the file folder 44 if it should accidentally be dislodged from the suspension bars during placement thereon or removal therefrom.

The means for driving the carrying or drive chain made up of links 15 for circulatory movement upon and around the track member 14 comprises a drive sprocket 48, which is disposed in concentric relation to a semi-circular end portion of the continuous track member 14, and in a plane to engage the rotatable sleeves or bushings 24 associated with the pivotally adjoined ends of the frame members or links 15 of the carrying or drive chain. The drive sprocket 48 is fixed to a perpendicular drive shaft 49 that is journaled in pillow block bearings (not shown), the latter being suitably supported in connection with an end portion of the upper beam 10 of the conveyor. Said drive sprocket 48 is provided with sprocket teeth 50 so circumferentially spaced as to match with and engage the sleeves or bushings 24 associated with the pivotally adjoined ends of the frame members or links 15 of the drive or carrying chain whereby, when the drive sprocket 48 is rotated, said sprocket will propel the carrying or drive chain in circulatory movement upon and along the track member 14. A similar idler sprocket (not shown) is preferably mounted concentric to the opposite semi-circular end portion of the continuous track member 14 so as to similarly engage and support the carrying or drive chain for operative circulatory movement. This idler sprocket is also fixed upon a perpendicular shaft that is journaled in pillow block bearings suitably supported in connection with the opposite end portion of the upper beam 10.

Figure 3:
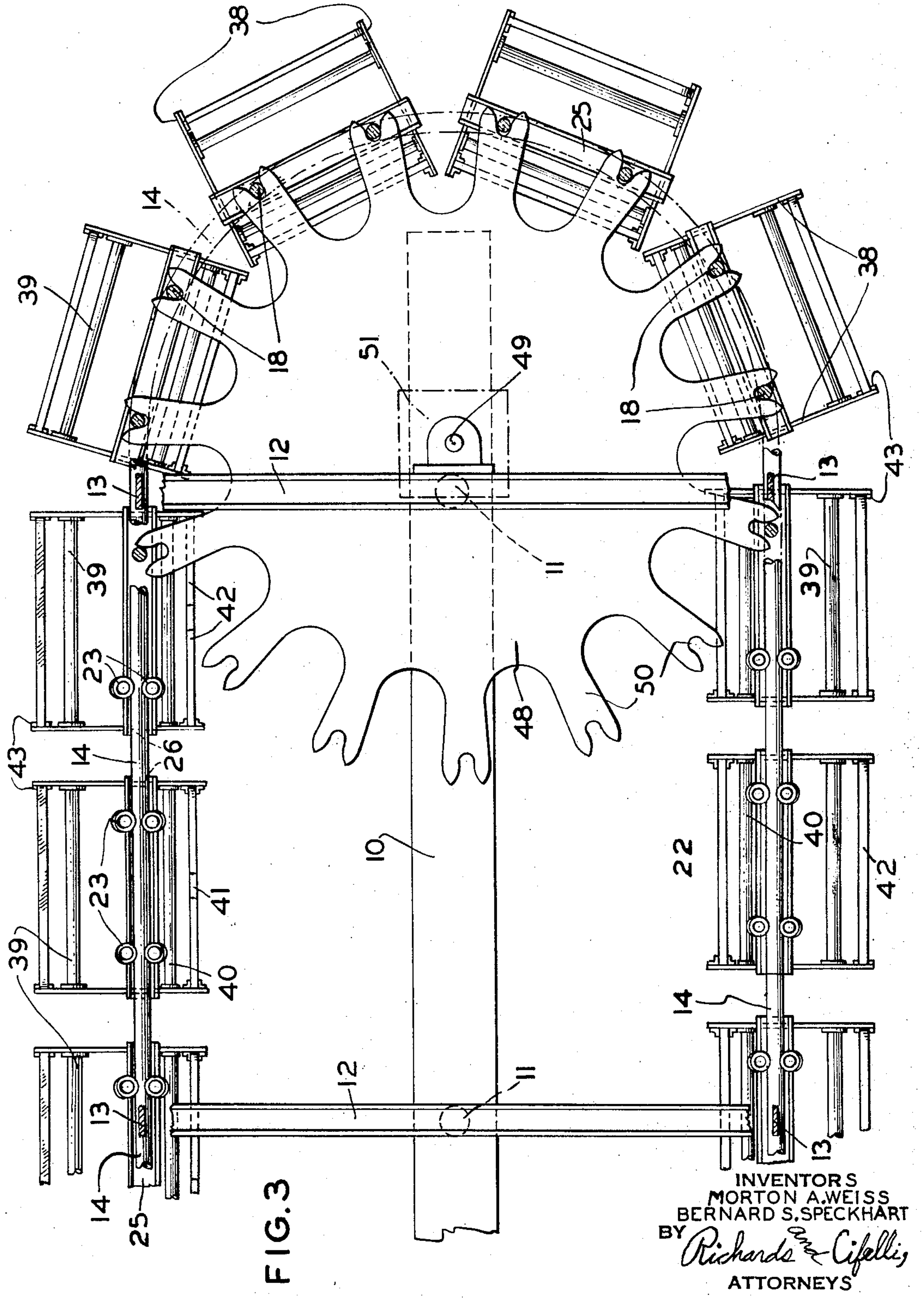
FIG. 3 is a fragmentary top plan view showing one end of the apparatus of FIG. 1 including the drive means therefore.
Figure 4:
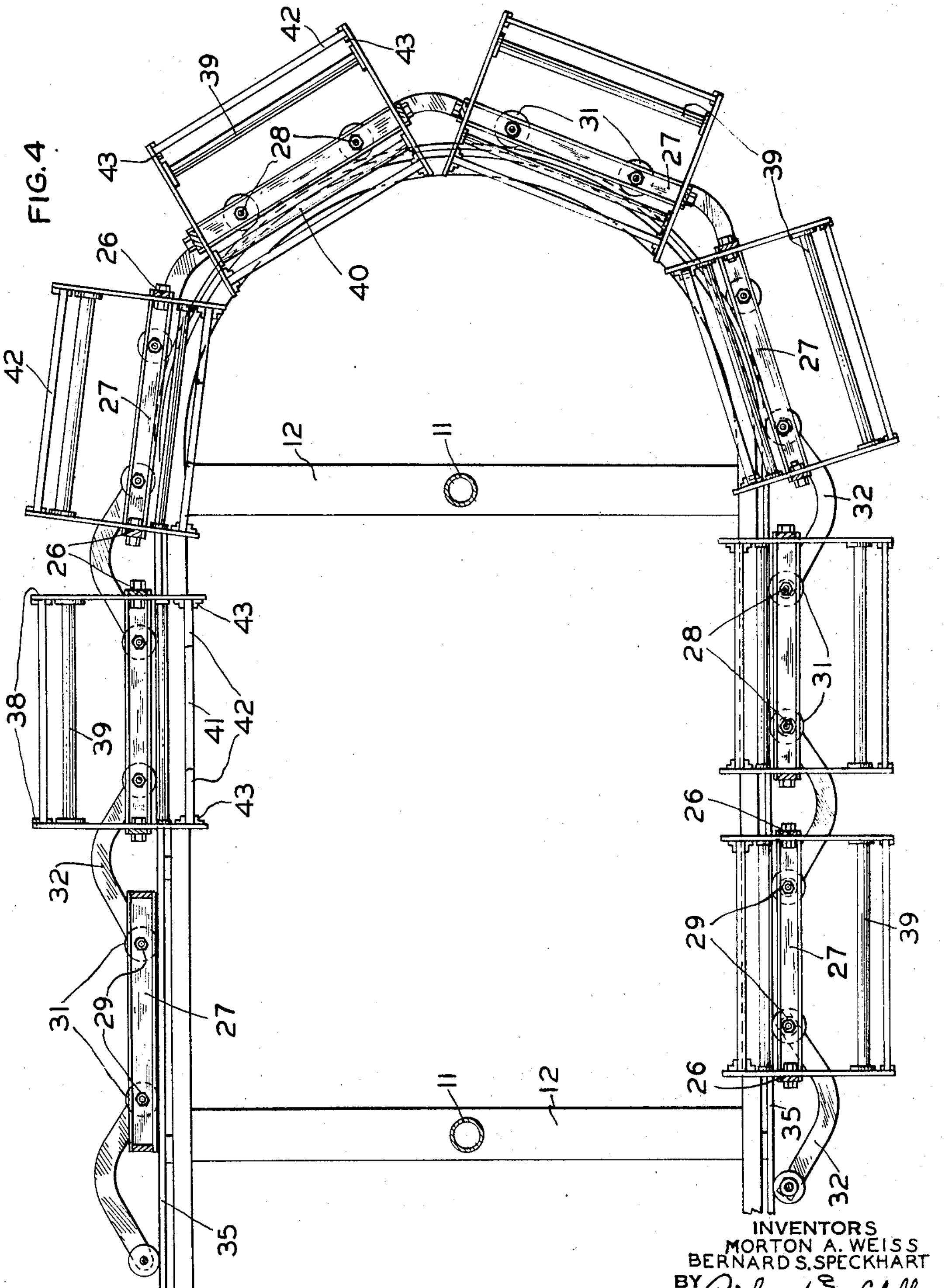
FIG. 4 is a fragmentary bottom plan view of the same apparatus showing further details of the structure thereof.

Any suitable power applying means may be utilized to operate the drive sprocket 48. An illustrative means for this purpose (as shown in FIG. 3) comprises an electric motor 51 which is supported upon the beam 10. Suitable gear reduction means (not shown) may also be mounted on beam 10, the power input side of which is adapted to be driven by the motor 51 through an interconnecting chain and sprocket transmission. The drive sprocket 48 is adapted to be driven from the power output side of the gear reduction means by a chain and sprocket transmisison which drives the shaft 49 by which said drive sprocket 48 is actuated.

Starting and stopping of the motor 51 is adapted to be controlled by a suitable manipulatable switch means which is included in the electric power circuit by which the motor is served. The motor 51 may be of the reversible type, so as to optionally drive the carrier or drive chain in one or an opposite direction.

In the use and operation of the file storage and conveyor rack of this invention, assuming, for example, it is installed in a business office, documents 52 which have been filed and stored in file folders 44 carried by the conveyor, are distributed in the conveyor in a predetermined manner, by alphabetical order, number, or other means of identification. The first file folder 44 shown in FIG. 1, for example, is labeled to contain documents relating to persons whose names begin with A–ABC; the second file folder 44 being for documents relating to persons whose names begin ABD–ABO, and so on through the end of the alphabet. When a particular document is called for, the file clerk, whose desk is preferably located immediately adjacent to the conveyor, manipulates the switch activating the conveyor so as to circulate the carrying chain until the desired file folder comes to hand, whereupon the document may be removed from the file folder 44, either by removing the folder 44 from the rack or, if the document can be readily identified, by simply leaving the folder 44 on the rack and slipping the document out of the open end thereof. It will be seen that in many cases, the clerk can file or remove a document while remaining seated at her desk, and in any case need no more than stand up to reach the file folders in the upper levels of the conveyor rack.

The new filing apparatus lends itself to a variety of arrangements which further increase the efficiency of a document storage and retrieval operation. For example, a series of filing conveyors of the type described and shown herein may be disposed with their long sides parallel, and with the relatively narrow end portions in a row to permit access thereto. In this way each of the conveyors is equivalent to a row of filing cabinets but since any document can be brought to the exposed end of the conveyor for access thereto, there is no need to provide aisles between the conveyors as would be necessary with filing cabinets. For this reason approximately twice as many documents may be stored in a given area of floor space using the new conveyor apparatus as would be possible using ordinary filing cabinets. Other arrangements of a plurality of the new filing conveyors, will occur to those skilled in the art. For example, a plurality of such conveyors may be arranged in radiation from a central point like the spokes of a wheel, thus permitting a single file clerk stationed at the hub of the wheel to service a large number of such conveyors without moving from the central position.

Although the present invention has been described in detail in conjunction with the specific apparatus shown in the accompanying drawings, this apparatus is merely illustrative and is not to be construed as limiting the scope of the invention as set forth in the appended claims.

We claim:

1. Apparatus for the storage and retrieval of document comprising: an upper endless track; an endless carrying chain comprising a series of pivotally interlinked frame members in end to end relation; means to suspend said carrying chain from said upper endless track for circulatory movement therealong; a plurality of longitudinally spaced file holder racks dependent from said carrying chain, each of said file holder racks comprising a pair of spaced end plates and a pair of spaced suspension bars extending between said end plates and spaced below and to the rear of said suspension bars; a lower endless track; means for interconnecting said racks and guiding the lower portions thereof along said lower endless track; and means for moving said carrying chain and racks around said endless tracks.

2. Apparatus according to claim 1, wherein each of said file holder racks has at least one similar file holder rack dependent therefrom.

3. Apparatus according to claim 1, wherein said plurality of longitudinally spaced file holder racks each has a plurality of similar file holder racks dependent therefrom, and each of said file holder racks also includes a rear guard bar extending between said end plates and spaced below and to the rear of said suspension bars, and a pair of spaced cross bars extending between said end plates at the top thereof.

4. Apparatus according to claim 1, wherein said plurality of longitudinally spaced file holder racks each has a plurality of similar file holder racks dependent therefrom, and each of said file holder racks also includes a rear guard bar extending between said end plates and spaced below and to the rear of said suspension bars, a pair of spaced cross bars extending between said end plates at the top thereof, and comprising a plurality of file folders suspended from said suspension bars.

5. Apparatus according to claim 1, wherein said plurality of longitudinally spaced file holder racks each has a plurality of similar file holder racks dependent therefrom, and each of said file holder racks also includes a rear guard bar extending between said end plates and spaced below and to the rear of said suspension bars, a pair of spaced cross bars extending between said end plates at the top thereof, and comprising a plurality of file folders suspended from said suspension bars, said file folders comprising a U-shaped dependent body open at both ends, and a pair of hooks attached to the upper edge of said body at each end thereof for suspension of said file folders from said suspension bars.

6. Apparatus according to claim 1, wherein said plurality of longitudinally spaced file holder racks each has a plurality of similar file holder racks dependent therefrom, and each of said file holder racks also includes a pair of spaced cross bars extending between said end plates at the top thereof, and comprising a plurality of file folders suspended from said suspension bars, said file folders comprising a U-shaped dependent body open at both ends, and a pair of hooks attached to the upper edge of said body at each end thereof for suspension of said file folders from said suspension bars, said hooks having substantially the same radius of curvature as said suspension bars.

References Cited

UNITED STATES PATENTS

| | | | |
|---|---|---|---|
| 1,099,868 | 6/1914 | Ackerman | 312—184 |
| 1,867,159 | 7/1932 | Kline | 312—184 |
| 1,881,938 | 10/1932 | Prodhomme | 211—1.5 |
| 2,899,072 | 7/1959 | Weiss | 211—1.5 |
| 3,192,645 | 7/1965 | Georg | 198—177 X |

CHANCELLOR E. HARRIS, *Primary Examiner.*